United States Patent
Watt et al.

(10) Patent No.: US 7,708,460 B1
(45) Date of Patent: May 4, 2010

(54) METHOD AND APPARATUS FOR MEASURING TEMPERATURE ON A SILICON DEVICE

(75) Inventors: Jeffrey T. Watt, Palo Alto, CA (US); Shuxian Chen, Fremont, CA (US)

(73) Assignee: Altera Corporation, San Jose, CA (US)

( * ) Notice: Subject to any disclaimer, the term of this patent is extended or adjusted under 35 U.S.C. 154(b) by 214 days.

(21) Appl. No.: 11/904,843

(22) Filed: Sep. 28, 2007

(51) Int. Cl.
*G01K 1/00* (2006.01)
(52) U.S. Cl. .................................... 374/100; 324/160
(58) Field of Classification Search ............... 374/100, 374/178, 173, 185; 324/160
See application file for complete search history.

(56) References Cited

U.S. PATENT DOCUMENTS

| | | | | |
|---|---|---|---|---|
| 6,824,307 B2 * | 11/2004 | Vail et al. | .................. | 374/183 |
| 6,890,097 B2 * | 5/2005 | Tanaka | .................. | 374/185 |
| 7,127,368 B2 * | 10/2006 | Choi | .................. | 702/130 |
| 7,268,569 B2 * | 9/2007 | Vassighi et al. | .................. | 324/760 |
| 7,275,011 B2 * | 9/2007 | Bueti et al. | .................. | 702/130 |
| 7,458,052 B1 * | 11/2008 | Chandra et al. | .................. | 716/10 |
| 2004/0071189 A1 * | 4/2004 | Tanaka | .................. | 374/183 |
| 2005/0232333 A1 * | 10/2005 | Franch et al. | .................. | 374/178 |
| 2007/0206656 A1 * | 9/2007 | Franch et al. | .................. | 374/178 |
| 2008/0101436 A1 * | 5/2008 | Jung | .................. | 374/170 |
| 2008/0187024 A1 * | 8/2008 | Franch et al. | .................. | 374/178 |
| 2008/0291970 A1 * | 11/2008 | Franch et al. | .................. | 374/178 |
| 2009/0059997 A1 * | 3/2009 | Sudo | .................. | 374/173 |
| 2009/0129432 A1 * | 5/2009 | Luniewski | .................. | 374/100 |

* cited by examiner

*Primary Examiner*—Andre J Allen
(74) *Attorney, Agent, or Firm*—L. Cho

(57) ABSTRACT

A method for measuring temperature on a silicon device includes activating a heat source on the silicon device. A value of a parameter of an electronic component on the silicon device is measured. A temperature associated with the electronic component is determined from the value of the parameter.

26 Claims, 8 Drawing Sheets

METHOD AND APPARATUS FOR MEASURING TEMPERATURE ON A SILICON DEVICE

TECHNICAL FIELD

Embodiments of the present invention relate to temperature measurement tools. More specifically, embodiments of the present invention relate to a method and apparatus measuring temperature on a silicon device.

BACKGROUND

When designing devices such as field programmable gate arrays (FPGAs) on silicon, modeling is often performed to determine the properties and characteristics of materials and components on the silicon for performance purposes. Among the properties and characteristics that are modeled, temperature is one which requires special consideration as it impacts the performance and operability of components. As process technology has moved to and beyond 45 nm, the impact of temperature has only increased.

Pulse current measurement techniques have been used in the past to perform temperature readings on a silicon device. Measurement using pulses on a nanosecond time scale eliminates self-heating which had previously affected static measurements of silicon-on-insulator (SOI) metal oxide semiconductor field effect transistors (MOSFETs). Elimination of self-heating during measurement required that the measurements be made on a short time scale, and that there be a long relaxation time between measurements. The output characteristics of 0.2 μm partially depleted SOI transistors measured by this technique reproduced the kink effect, and represented the true output conductance and transconductance.

In order to utilize pulse current measurement techniques, an elaborate measurement system was needed. For example, a pulse generator was used to apply short voltage pulses to the device. An oscilloscope was also used to measure currents. The pulse current measurement techniques provided limited information regarding temperatures at multiple locations on a silicon device.

SUMMARY

According to an embodiment of the present invention, a method and apparatus for measuring temperature on a silicon device is disclosed. According to one embodiment, a heat source on the silicon device is activated. The heat from the heat source transfers to other electronic components on the silicon device. Values of a parameter of the other electronic components are measured. Temperatures associated with the electronic components are determined from the values of the parameter. The heat source and the electronic components may be implemented using a multi-finger MOSFET. The parameter measured may be leakage current measured from either a drain side or source side of the MOSFET transistors.

In addition to determining the temperatures associated with the electronic components, the temperature of the heat source may be extrapolated from the temperatures. Furthermore, a self-heating effect occurring when all the MOSFET transistors are turned on may be predicted.

BRIEF DESCRIPTION OF THE DRAWINGS

The features and advantages of the present invention are illustrated by way of example and are by no means intended to limit the scope of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

According to an embodiment of the present invention, a temperature measurement unit may be used to take temperature measurements at positions on a silicon device. The silicon device may include any type of electronic circuit implemented on silicon or alternatively a piece of silicon without any circuitry.

Figure 1:
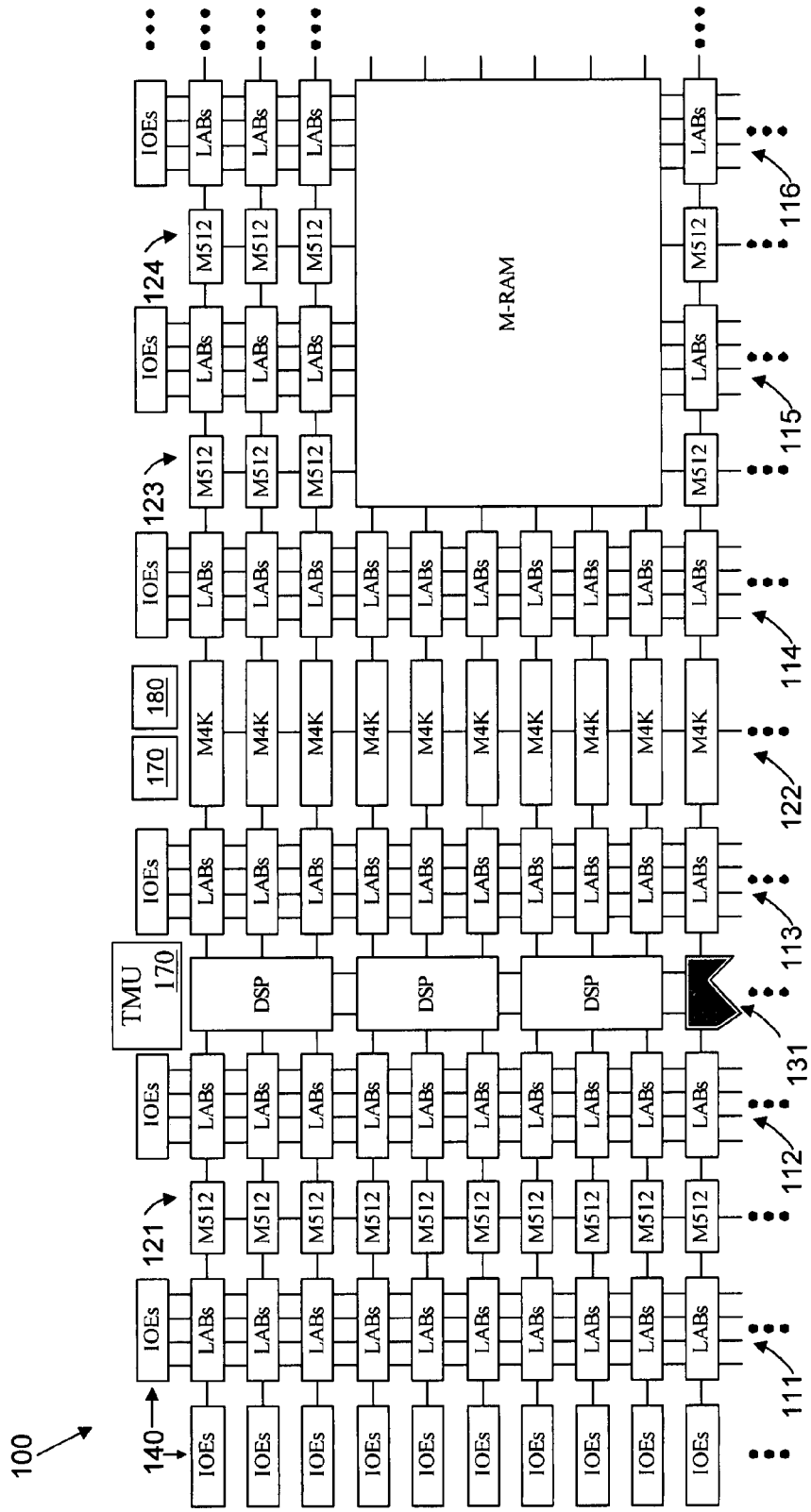
FIG. 1 illustrates a device on which a temperature measuring unit may be implemented on according to an exemplary embodiment of the present invention.

FIG. 1 illustrates a silicon device 100 on which a temperature measurement unit may reside on according to an exemplary embodiment of the present invention. In this example, the silicon device 100 is a target device such as an FPGA which a system may be implemented on. The target device 100 may be a chip having a hierarchical structure that may take advantage of wiring locality properties of circuits formed therein.

The target device 100 includes a plurality of logic-array blocks (LABs). Each LAB may be formed from a plurality of logic blocks, carry chains, LAB control signals, (lookup table) LUT chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in Stratix™ manufactured by Altera® Corporation, or a combinational logic block (CLB) such as those found in Virtex™ manufactured by Xilinx® Inc. In this embodiment, the logic block may include a four input lookup table (LUT) with a configurable register. According to an alternate embodiment of the present invention, the logic block may operate similarly to an adaptive logic module (ALM), such as those found in Stratix™ manufactured by Altera® Corporation. LABs are grouped into rows and columns across the target device 100. Columns of LABs are shown as 111-116. It should be appreciated that the logic block may include additional or alternate components.

The target device 100 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the target device in between selected LABs or located individually or in pairs within the target device 100. Columns of memory blocks are shown as 121-124.

The target device 100 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the target device 100 and are shown as 131.

The target device 100 includes a plurality of input/output elements (IOEs) 140. Each IOE feeds an I/O pin (not shown) on the target device 100. The IOEs are located at the end of LAB rows and columns around the periphery of the target device 100. Each IOE includes a bidirectional I/O buffer and a plurality of registers for registering input, output, and output-enable signals. When used with dedicated clocks, the registers provide performance and interface support with external memory devices.

The target device 100 may include routing resources such as LAB local interconnect lines, row interconnect lines ("H-type wires"), and column interconnect lines ("V-type wires") (not shown) to route signals between components on the target device.

The target device 100 includes a temperature measuring unit (TMU) 170. According to an embodiment of the present invention, the temperature measuring unit 170 includes a heat source (not shown). The temperature measuring unit 170 also includes a plurality of electronic components (not shown) located at various positions on the target device 100 that operate as temperature measuring components. The plurality of electronic components are temperature sensitive and generate parameters in response to activation of the heat source. The temperature measuring unit 170 output the parameters which may be used to derive the temperature at the various positions on the target device 100. The temperature measuring unit 170 is illustrated as being positioned between input/output elements and DSP block. It should be appreciated that the temperature measuring unit 170 may be placed anywhere on the target device 100 and that more than one temperature measuring unit 170 may be implemented on the target device 100.

Figure 2:
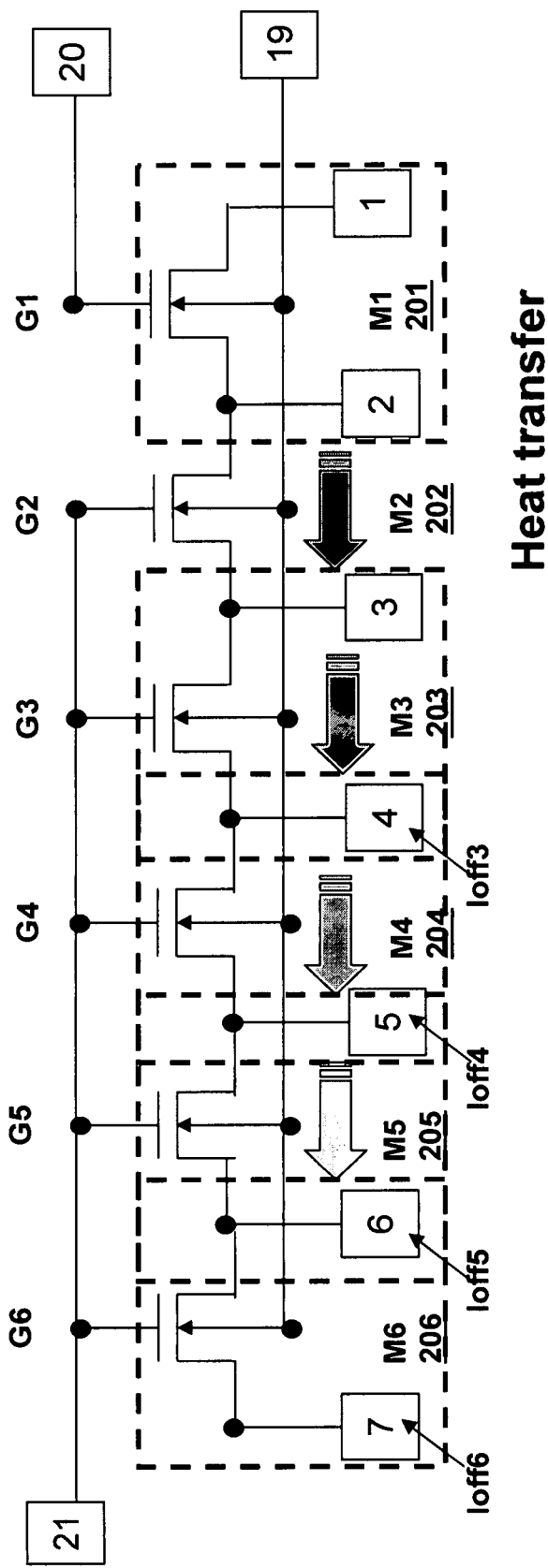
FIG. 2 illustrates a temperature measuring unit according to an exemplary embodiment of the present invention.

FIG. 2 illustrates a temperature measuring unit 200 according to an exemplary embodiment of the present invention. The temperature measuring unit 200 may be used to implement the temperature measuring unit 170 (shown in FIG. 1). The temperature measuring unit 200 may be implemented using a multiple-fingered MOSFET. The multiple-fingered MOSFET includes a plurality of MOSFET transistors 201-206 connected in series where one transistor may share its source/drain with a drain/source of another transistor. M1 represents a first transistor 201 with a gate G1 and a source connected to pad 2 and a drain connected to pad 1. M2 represents a second transistor with a gate G2 and a source connected to pad 3 and a drain connected to pad 2. M3 represents a third transistor with a gate G3 and a source connected to pad 4 and a drain connected to pad 3. M4 represents a fourth transistor with a gate G4 and a source connected to pad 5 and a drain connected to pad 4. M5 represents a fifth transistor with a gate G5 and a source connected to pad 6 and a drain connected to pad 5. M6 represents a sixth transistor with a gate G6 and a source connected to pad 7 and a drain connected to pad 6. The temperature measuring unit 200 is shown to include 6 transistors, however, it should be appreciated that any number of transistors may be implemented.

Transistor 201 may operate as a heating source. To activate the heating source, a voltage may be applied at the gate G1 of transistor 201 at pad 20 and at the drain at pad 1 while the source is at zero volts. Transistors 203-206 may operate as temperature measuring components. Gates G3-G6 of transistors 203-206 are set to zero volts by grounding pad 21. As a voltage is applied across each of the transistors 203-206, the leakage current across the transistor (Ioff3-Ioff6) may be measured.

Transistor 201 may operate at varied power. The heat generated by the channel of transistor 201 is transferred to the channels of transistors 203-206 which impacts the channel leakage current. Transistors 203-206 may operate as electronic components where the channel leakage current of transistors 203-206, Ioff3-Ioff6, may be measured at pad 4 through pad 7, respectively. The temperature associated with each channel may be derived from its value of the leakage current based on the relationship between leakage current and temperature. According to an embodiment of the present invention, the relationship between leakage current and temperature may be determined by modeling or alternatively by taking measurements using a tool such as probe station. Using the derived temperature values, a temperature vs. distance to heat source plot may be generated from which a temperature at the first transistor 201 may be extrapolated. The temperature of the transistors 201-206 when all of the gates are turned on may also be derived.

Although the temperature measuring unit 200 in FIG. 2 is illustrated as being implemented using a multiple-fingered MOSFET where leakage current is the parameter measured for deriving temperature, it should be appreciated that other circuitry may be used to measure other parameters that may be used to derive temperature. For example, the temperature measuring unit 200 may be implemented using a plurality of diodes for temperature measuring components where the parameter that is measured is leakage current. Alternatively, the temperature measuring unit 200 may be implemented using a plurality of gate oxide capacitors for temperature measuring components where the parameter that is measured is gate leakage current. The temperature measuring unit 200 may also implement a plurality of resistors for temperature measuring components where the parameter that is measured is resistance. It should also be appreciated that although FIG. 2 illustrates the temperature measuring components as being coupled in series, the temperature measuring components may be arranged in a different manner. Furthermore, the temperature measuring unit 200 is illustrated with a plurality of pads. It should be appreciated that an embodiment of the present invention which uses the temperature measuring unit 200 as a test structure may utilize the plurality of pads. However, in embodiments where the temperature measuring unit 200 is used in a product such as an FPGA chip, no pads are used. Instead, the temperature measuring unit 200 may be interfaced to other circuitry using interconnects.

Figure 3:
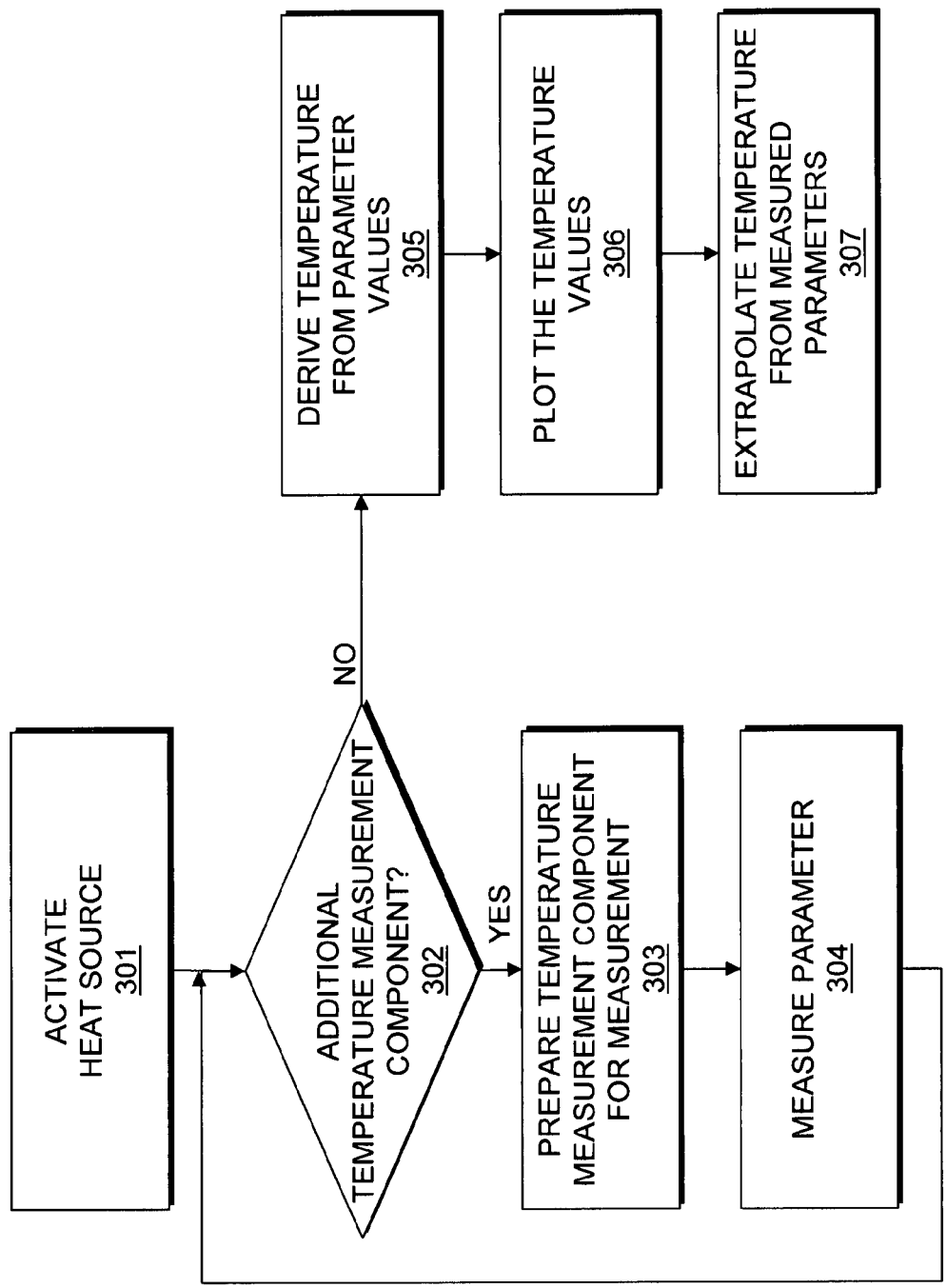
FIG. 3 is a flow chart illustrating a method for measuring temperature on a silicon device according to an exemplary embodiment of the present invention.

FIG. 3 is a flow chart illustrating a method for measuring temperature on a silicon device according to an exemplary embodiment of the present invention. At 301, a heat source is activated. With reference to the embodiment illustrated at FIG. 2, a heat source such as transistor 201 may be activated by applying a voltage at a gate G1 of the transistor 201 through pad 20 and by applying a voltage at a drain of the transistor 201 through pad 1.

Returning to FIG. 3, at 302, it is determined whether additional temperature measurement components are to be read from. According to an embodiment of the presenting invention, each temperature measurement component is read from at least once. If it is determined that an additional temperature measurement component is to be read from, control proceeds to 303. If it is determined that an additional temperature measurement component is not to be read from, control proceeds to 305.

At 303, the next temperature measurement component is prepared for temperature measurement. With reference to FIG. 2, temperature measurement components such as transistors 203-206 may be prepared for temperature measurement by applying a voltage across the transistor while the gate is off in order to measure leakage current.

Returning to FIG. 3, at 304, the parameter is measured. With reference to FIG. 2, the leakage current of a temperature measurement component may be measured by reading a current at the drain of the transistor. This may be achieved by reading a current value at pads 4-7 for transistors 203-207. It should be appreciated that a temperature measurement component may be prepared for temperature measurement by applying voltage across either the source to drain or drain to source of a transistor. Thus, depending on which direction voltage is applied across the transistor, either pads 4-7 or 3-6 may be used to read the leakage current. Control returns to 302.

Returning back to FIG. 3, at 305, temperature values are derived from the parameter values measured. According to an embodiment of the present invention, the parameter measured has a distinct relationship with temperature, allowing a temperature value to be derived from the parameter value measured. In one embodiment, a simulation may be performed to determine the relationship between the parameter and temperature. Alternatively, the relationship between the parameter and temperature may be determined by taking actual measurements using a tool such as a probe station.

Figure 4:
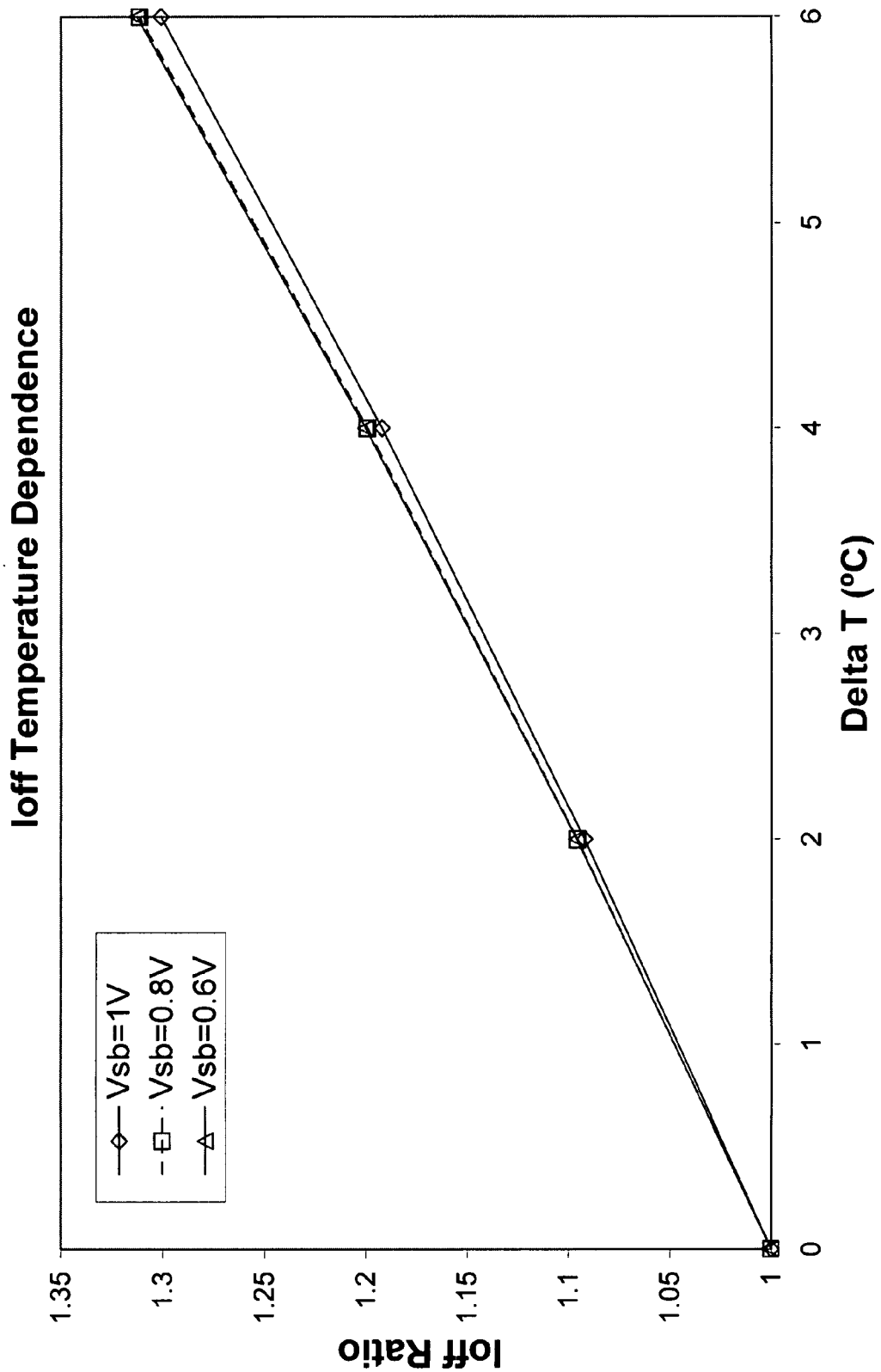
FIG. 4 is a chart that illustrates the relationship between leakage current and temperature according to an exemplary embodiment of the present invention.

FIG. 4 is a chart that illustrates the relationship between leakage current (Ioff) and temperature according to an exemplary embodiment of the present invention. The relationships were determined using a simulation of the temperature measurement unit 200 (shown in FIG. 2) on a silicon device. The chart may be used to derive a temperature of at a location associated with the transistor from the leakage current measured from the transistor.

Returning back to FIG. 3, at 306 the temperature values derived from the parameter values are plotted on a graph.

At 307, temperature values at other locations may be extrapolated from the measured parameters. According to an embodiment of the present invention, extrapolation may be used to derive a function of the temperature values plotted on the graph. The function may be used to predict the temperature of other locations on a silicon device. According to one embodiment an extrapolation technique such as linear or non-linear regression or other technique may be used.

Figure 5:
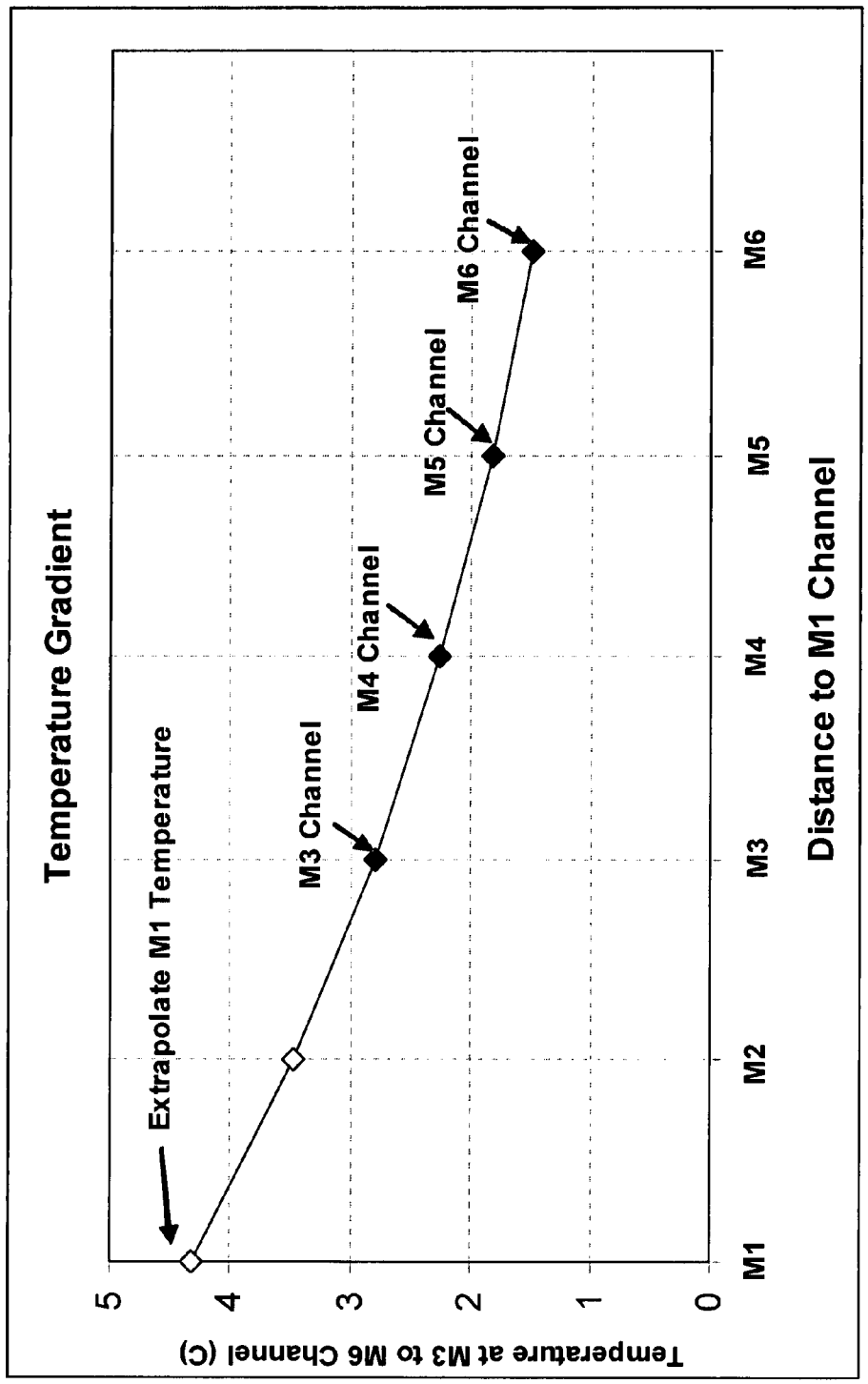
FIG. 5 is a chart that illustrates a temperature gradient of the silicon device.

FIG. 5 is a chart that illustrates a temperature gradient of the silicon device. The chart plots the temperature values of transistors 203 M3, 204 M4, 205 M5, and 206 M6 derived from the measurement of the current leakage of the transistors. From these 4 points, the temperature of the heat source, transistor 201 M1, as well as transistor 202 M2, may be extrapolated as shown.

Figure 6:
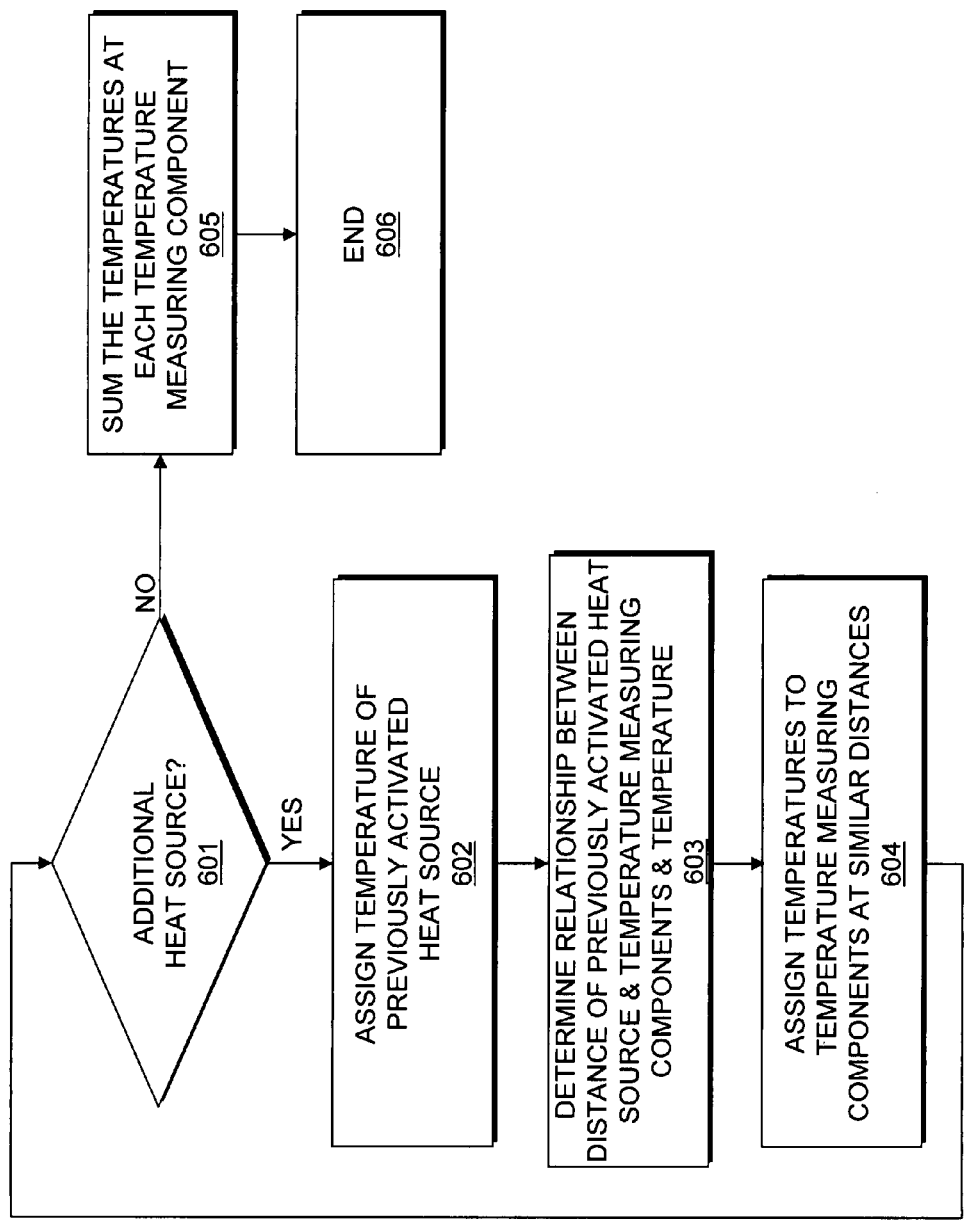
FIG. 6 is a flow chart illustrating a method to characterize MOSFET channel temperature according to an exemplary embodiment of the present invention.

FIG. 6 is a flow chart illustrating a method to characterize MOSFET channel temperature according to an exemplary embodiment of the present invention. In this embodiment, the MOSFET channel temperatures correspond to a multi-fingered MOSFET that have transistors that are spaced a fixed distance apart such as the multi-fingered MOSFET shown in FIG. 2. It should be appreciated that this method may also be used to characterize temperature measured by a temperature measuring unit having temperature measuring components spaced a fixed distance apart. According to an embodiment of the present invention, the procedure described with reference to FIG. 6 is performed after temperature values are determined and/or extrapolated for a heat source and all temperature measuring components. At 601, it is determined whether temperature values for an additional heat source are to be characterized. If temperature values for an additional heat source are to be characterized, control proceeds to 602. If temperature values for an additional heat source are not to be characterized, control proceeds to 605.

At 602, a temperature of a previously activated heat source is assigned to the new heat source.

At 603, a relationship between the distance of the previously activated heat source and temperature measuring components and temperature is determined.

At 604, temperature values are assigned to temperature measuring components at similar distances from the new heat source. Control returns to 601.

At 605, the temperature at each temperature measuring component is summed. According to an embodiment of the present invention, summing the temperatures derived for each temperature measuring component with all heating sources being activated derives the temperature of the temperature measuring component with the self-heating effect.

Figure 7:
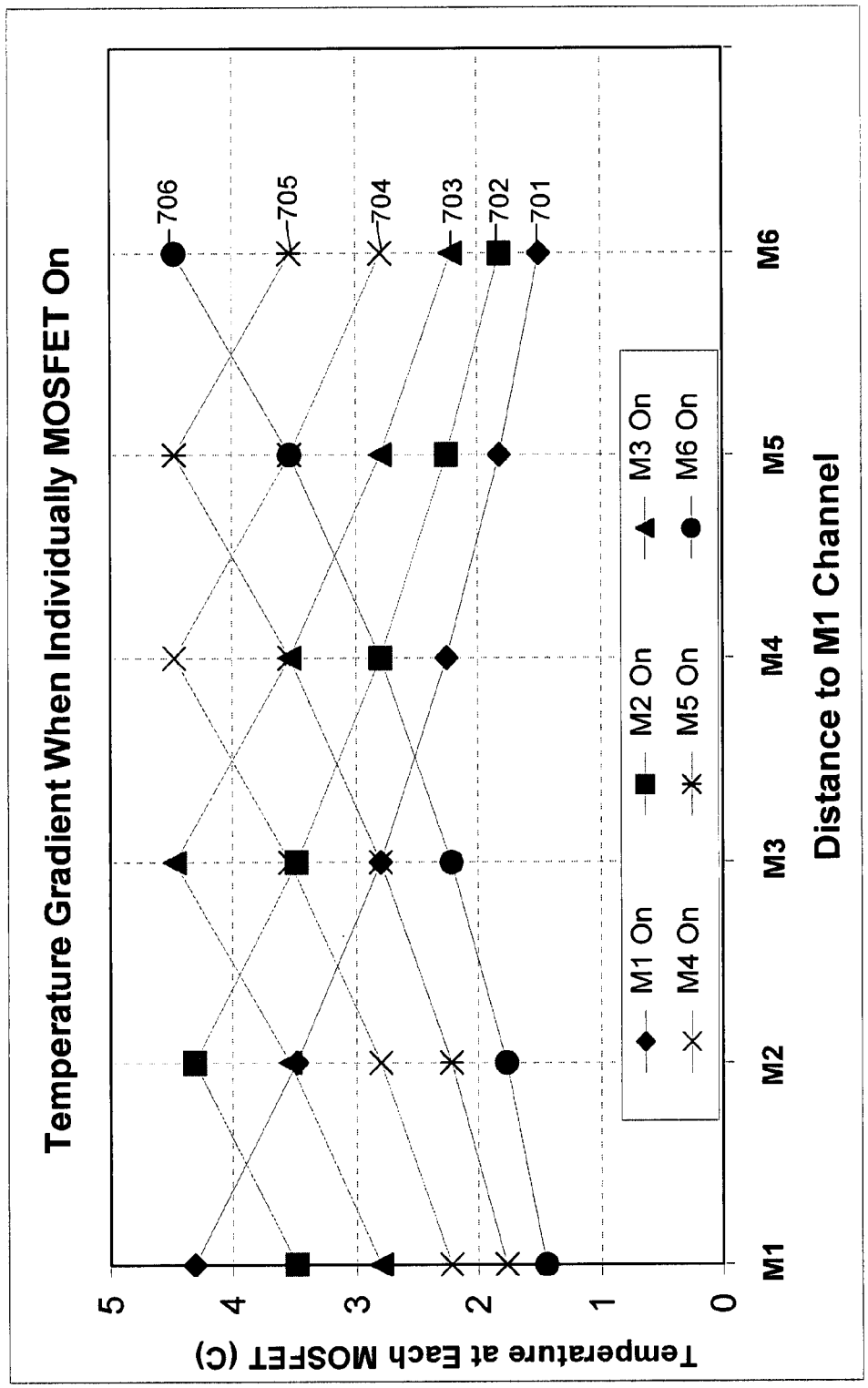
FIG. 7 is a chart that illustrates a temperature gradient when each individual MOSFET is on while others are off according to an exemplary embodiment of the present invention.

FIG. 7 is a chart that illustrates a temperature gradient when each individual MOSFET is on while others are off according to an exemplary embodiment of the present invention. FIG. 7 illustrates exemplary plots of temperature readings measured and derived from the temperature measuring unit 200 illustrated in FIG. 2. Curve 701 represents a plot that illustrates the temperature of transistors 201 through 206 (M1-M6) with transistor 201 activated as the heating source. The temperature points are measured or extrapolated as described with reference to FIG. 5.

Curve 702 represents a plot that illustrates the temperature of transistors 201 through 206 with transistor 202 activated as the heating source. The temperature points on curve 702 may be derived from the temperature points on curve 701 using the procedure described in FIG. 6. For example, the temperature at M2, the new heating source, is assigned the same value as M1 from curve 701 as described at 602. The temperature at M1 and M3 for curve 702, which is a one unit distance away from M2, is assigned the same value as M2 from curve 701, where M2 is also one unit distance away from M1 as described at 603-604. The temperatures at M4, M5, and M6 for curve 702 are assigned the same values as M3, M4, and M5 from curve 701. Both sets of values correspond to temperature measuring components which are three, four, and five unit distance away from the heating source.

Curves 703-706 are plots that illustrate the temperatures of transistors 201-206 with transistors 203-206 activated as the heating source, respectively. The temperature points on curves 703-706 may be derived in a similar manner as the temperature points on curve 702 using the procedure described with reference to FIG. 6.

Figure 8:
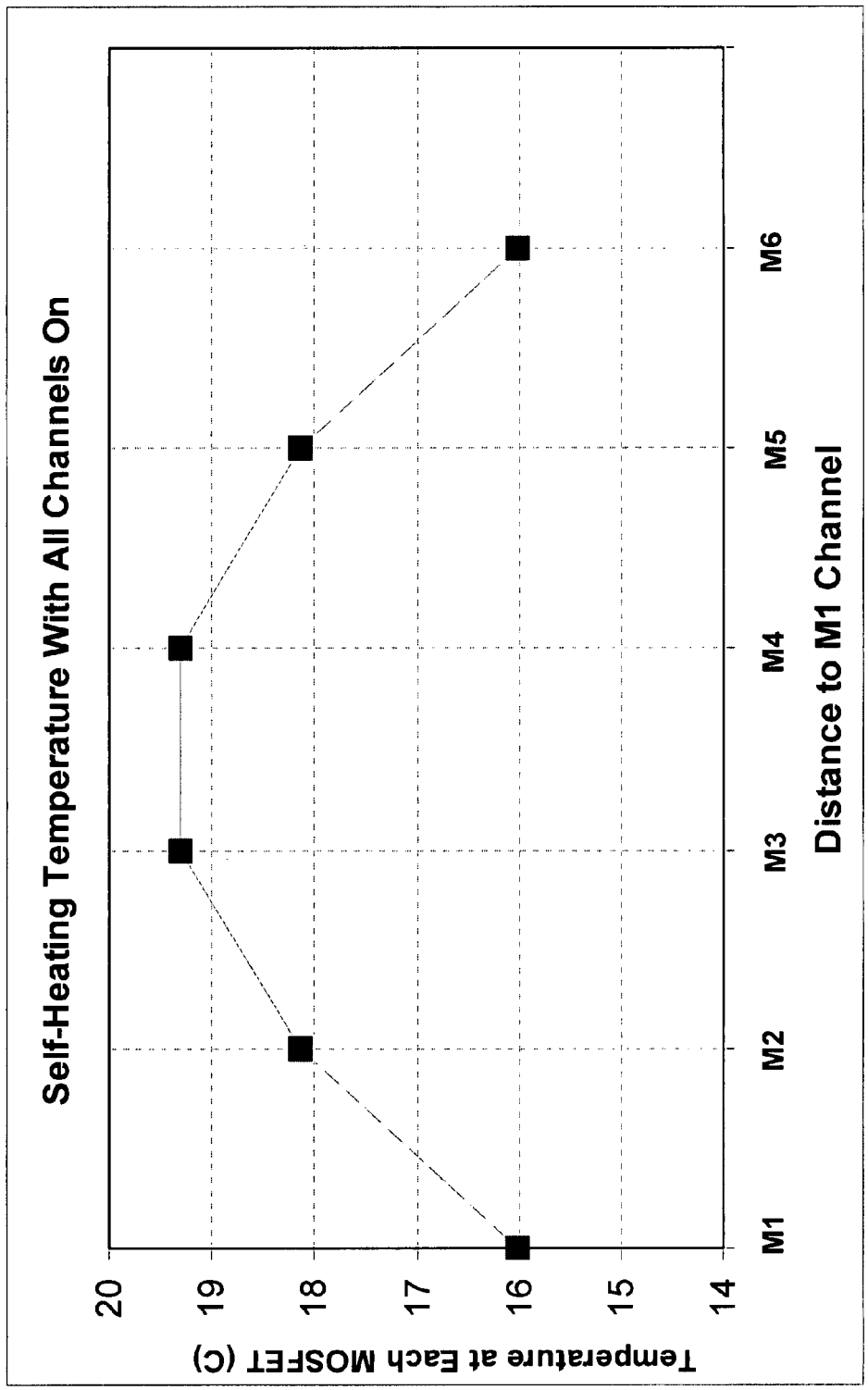
FIG. 8 is a chart that illustrates self-heating when all gates of the MOSFET are turned on according to an exemplary embodiment of the present invention.

FIG. 8 is a chart that illustrates self-heating when all gates of the MOSFET are turned on according to an exemplary embodiment of the present invention. According to an embodiment of the present invention, the temperature values for transistors 201-206 (M1-M6) are derived by summing the temperatures derived for each temperature measuring component with all heating sources being activated. Information regarding self-heating temperature when all the transistors in a multiple-fingered MOSFET is on may be useful in modeling circuits such as multiple-fingered ring oscillator circuits.

FIGS. 3 and 6 are flow charts illustrating embodiments of the present invention. Some of the procedures illustrated in this figure may be performed sequentially, in parallel or in an order other than that which is described. The techniques may be also be performed one or more times. It should be appreciated that not all of the techniques described are required to be performed, that additional techniques may be added, that some of the illustrated techniques may be substituted with other techniques, and other specifics may be utilized to practice the procedures described.

According to an embodiment of the present invention, a method and apparatus is disclosed to characterize 45 nm MOSFET channel temperature through leakage current measurement. Embodiments of the present invention may be used to predict multiple-fingered MOSFET self-heating effect. This may allow characterization of MOSFET channel temperature to improve MOSFET model accuracy by adding self-heating effect in multiple-fingered versus single-fingered MOSFET and more accurate prediction of circuit performance by correctly modeling multiple-fingered MOSFET behavior in circuits. Furthermore, embodiments of the present invention may be used to monitor regional temperature change and temperature gradient from a heat source.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for measuring temperature on a silicon device, comprising:
    activating a heat source on the silicon device;
    measuring a value of a parameter of an electronic component on the silicon device;
    determining a temperature associated with the electronic component from the value of the parameter;
    measuring a value of a parameter of another electronic component on the silicon device;
    determining a temperature associated with the another electronic component from the value of the parameter of the another electronic component; and
    extrapolating a temperature of the heat source from the temperature associated with the electronic components.

2. The method of claim 1, wherein the value of the parameter of the electronic component device is temperature dependent.

3. The method of claim 1, wherein determining the temperature associated with the electronic component from the value of the parameter of the electronic component on the silicon device comprises looking up a temperature value associated with the value of the parameter of the electronic component on the silicon device.

4. The method of claim 3, wherein the temperature value associated with the value of the parameter of the electronic component on the silicon device is generated from a simulation.

5. The method of claim 3, wherein the temperature value associated with the value of the parameter of the electronic component on the silicon device is generated from a measurement taken from a probe station.

6. The method of claim 1, wherein the heating source is a metal oxide semiconductor field effect transistor (MOSFET).

7. The method of claim 1, wherein the electronic component is a metal oxide semiconductor field effect transistor (MOSFET) and the parameter of the electronic component on the silicon device is leakage current.

8. The method of claim 1, wherein the electronic component is a diode and the parameter of the electronic component on the silicon device is leakage current.

9. The method of claim 1, wherein the electronic component is a gate oxide capacitor and the parameter of the electronic component on the silicon device is gate leakage current.

10. The method of claim 1, wherein the electronic component is a resistor and the parameter of the electronic component on the silicon device is resistance.

11. A method for measuring temperature, comprising:
    applying current at a gate of a first metal oxide semiconductor field effect transistor (MOSFET) in a multiple-fingered MOSFET;
    measuring leakage current at a second MOSFET; and
    determining a temperature of a channel associated with the second MOSFET from the leakage current.

12. The method of claim 11, wherein determining the temperature of the channel associated with the second MOSFET comprises looking up a temperature value associated with the value of the leakage current.

13. The method of claim 11, further comprising:
    measuring a leakage current at a third MOSFET;
    determining a temperature of a channel associated with the third MOSFET from the leakage current; and
    extrapolating a temperature at the first MOSFET from the temperature of the channels associated with the second and third MOSFETs.

14. The method of claim 13, further comprising inferring a temperature gradient when one of the MOSFETs are on while the other MOSFETs are off.

15. The method of claim 14, further comprising inferring a temperature of the MOSFETs when all gates are turned on.

16. A temperature measurement unit for a silicon device, comprising:
    a heat source;
    a plurality of electronic components on the silicon device that generate parameter values in response to the heat source, wherein the plurality of electronic components includes one of 1) metal oxide semiconductor field effect transistors (MOSFETs) connected in series, 2) diodes, and 3) gate oxide capacitors, and the parameter values leakage current values; and
    an output to output the parameter values.

17. A method for measuring temperature on a silicon device, comprising:
    activating a heat source on the silicon device;
    measuring a value of a parameter of an electronic component on the silicon device, wherein the electronic component is a metal oxide semiconductor field effect transistor (MOSFET) and the parameter is leakage current; and
    determining a temperature associated with the electronic component from the value of the parameter.

18. The method of claim 17, wherein determining the temperature associated with the electronic component from the value of the parameter comprises looking up a temperature value associated with the value of the parameter.

19. The method of claim 18, wherein the temperature value associated with the value of the parameter is generated from a simulation.

20. The method of claim 18, wherein the temperature value associated with the value of the parameter is generated from a measurement taken from a probe station.

21. The method of claim 17, further comprising:
measuring a value or a parameter of another electronic component on the silicon device;
determining a temperature associated with the another electronic component from the value of the parameter; and
extrapolating a temperature of the heat source from the temperature associated with the electronic components.

22. The method of claim 17, wherein the heating source is a MOSFET.

23. A method for measuring temperature on a silicon device, comprising:
activating a heat source on the silicon device;
measuring a value of a parameter of an electronic component on the silicon device, wherein the electronic component is one of 1) a metal oxide semiconductor field effect transistor (MOSFET), 2) diode, and 3) capacitor; and
determining a temperature associated with the electronic component from the value of the parameter.

24. The method of claim 23, wherein the parameter is leakage current.

25. The method of claim 23, further comprising:
measuring a value of a parameter of another electronic component on the silicon device;
determining a temperature associated with the another electronic component from the value of the parameter; and
extrapolating a temperature of the heat source from the temperature associated with the electronic components.

26. The method of claim 1, wherein the heating source is a MOSFET.

* * * * *